United States Patent

Meiers

[11] 3,913,473
[45] Oct. 21, 1975

[54] BALE WRAPPING MECHANISM FOR LARGE CYLINDRICAL BALES

[75] Inventor: Gerald Franklyn Meiers, Ottumwa, Iowa

[73] Assignee: Deere & Company, Moline, Ill.

[22] Filed: July 17, 1974

[21] Appl. No.: 489,350

[52] U.S. Cl. .................................. 100/5; 100/88
[51] Int. Cl.² ........................................ B65B 13/20
[58] Field of Search ............... 100/5, 13, 88; 56/341

[56] References Cited
UNITED STATES PATENTS

| | | | |
|---|---|---|---|
| 2,627,223 | 2/1953 | Berge | 100/13 |
| 2,826,985 | 3/1958 | Harrer | 100/5 |
| 2,829,585 | 4/1958 | Varvel | 100/5 |
| 2,850,964 | 9/1958 | Harrer | 100/5 |
| 3,064,556 | 11/1962 | Luebben | 100/5 |
| 3,722,197 | 3/1973 | Vermeer | 56/341 |

*Primary Examiner*—Billy J. Wilhite

[57] ABSTRACT

A machine for forming large cylindrical bales includes a mobile main frame with crop delivery means operative to deliver a mat of crop material to a baling zone where a bale forming mechanism rolls the mat of material into a cylindrical bale and is operative to continue rolling the bale after it reaches a selected size. After the bale reaches its selected size, a twine dispensing mechanism is actuated to feed twine from a roll of twine on the machine to the bailing zone while the bale is rotated, the twine dispensing mechanism including an arm that carries the twine and swings in a generally horizontal arc from one side of the baling zone to the other so that the twine is wrapped in a spiral about the bale as it rotates. The arm is controlled by a two-way hydraulic cylinder, which moves the arm in one direction during the start of the tying cycle and returns the arm to a rest position during its return stroke, and a cutoff mechanism is actuated when the arm reaches its rest position to automatically cut the twine to discontinue the wrapping. A variable orifice is provided between the control valve for the cylinder and the cylinder to selectively vary the rate of retraction of the cylinder on its return stroke to selectively control the number of turns of twine placed on the bale during the return stroke.

17 Claims, 7 Drawing Figures

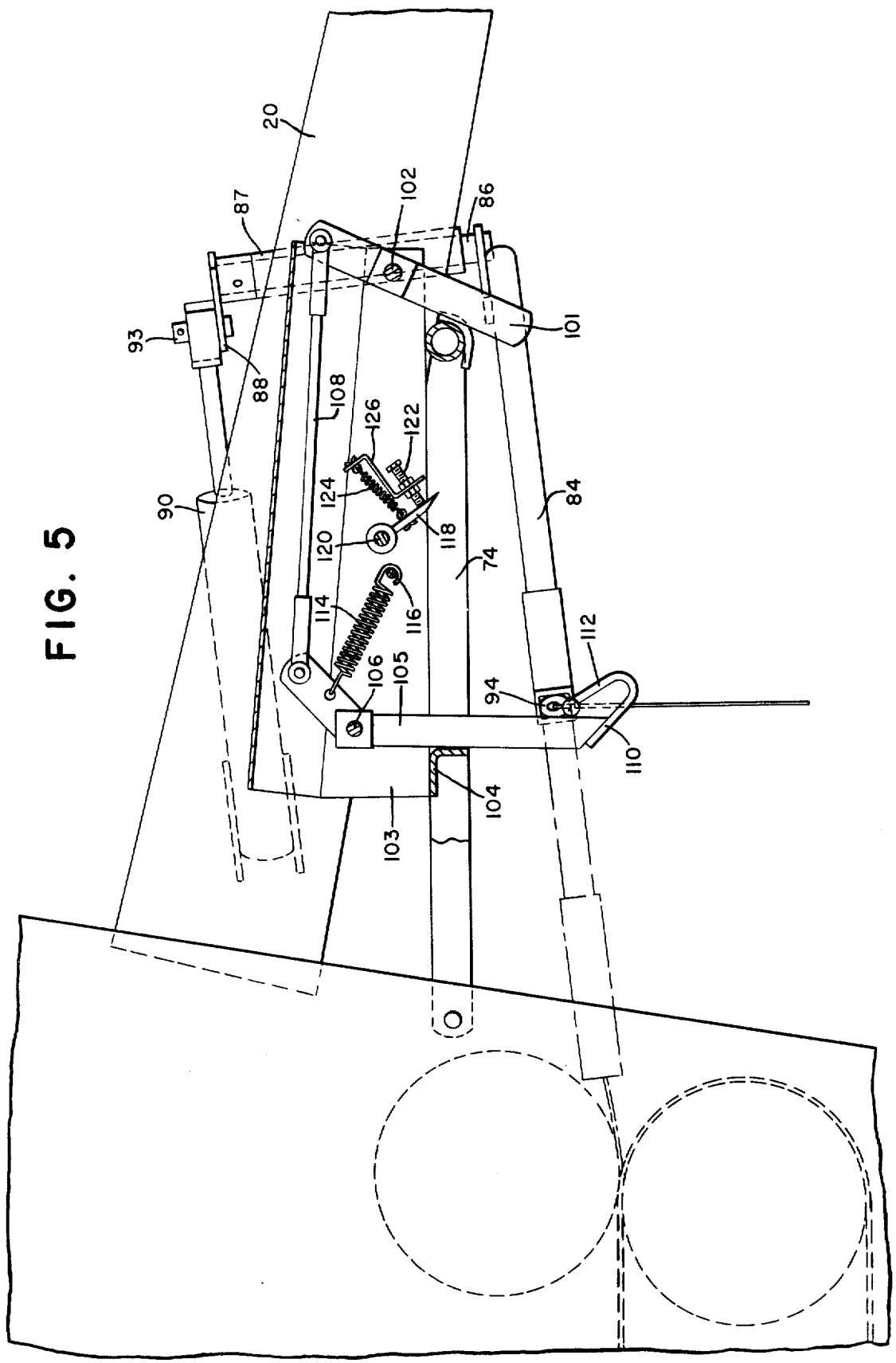

BALE WRAPPING MECHANISM FOR LARGE CYLINDRICAL BALES

BACKGROUND OF THE INVENTION

This invention relates to a machine for forming large cylindrical bales of hay or the like, and more particularly to an improved mechanism for wrapping twine or the like around the bale after it has been formed so that the bale is held together while it is being stored or transported.

Machines for forming cylindrical bales of agricultural crop materails have been well known for a substantial period of time, some of the machines rolling the crop along the ground, while other machines have utilized a pickup mechanism for removing the crop in the field as the machine advances, the crop material being delivered rearwardly to a baling chamber between a pair of conveyors that roll the crop material into a cylindrical bale while it is maintained off the ground. In machines of the latter type, it is known to provide means for dispensing twine or the like to the baling chamber after a bale has been formed and to continue rotating the formed bale while the twine is fed to the chamber so that the twine is wound around the bale. In recent machines of the above type, the twine dispensing mechanism has been manually actuated, and a manually actuated mechanism has also been provided so that the operator can cut the twine after the desired number of wraps of twine are placed on the bale.

SUMMARY OF THE INVENTION

According to the present invention, an improved mechanism is provided for dispensing twine or the like to the baling chamber of a cylindrical bale forming machine while a formed bale is rotated in the chamber to wind the twine around the bale.

An important feature of the present invention resides in the provision of an automatic cutoff device for automatically cutting the twine after a predetermined number of wraps are placed on the bale. Another feature of the invention resides in the provision of remotely controlled power means for actuating the twine dispensing mechanism. More specifically, the twine dispensing mechanism includes a generally horizontal arm that is swingable by power means about a generally vertical pivot, the twine being dispensed from the free end of the arm which swings in an arc substantially across the width of the baling chamber to dispense the twine across a substantial width of the bale as it swings from side to side. Also, when the arm completes one cycle of its reciprocating movement it actuates an automatic cutoff mechanism.

Another feature of the invention resides in the provision of means for holding the free end of the twine after a bale has been wrapped and the twine has been cut until the start of the next wrapping cycle, when the free end of the twine is released for feeding to the baling chamber.

BRIEF DESCRIPTION OF THE DRAWINGS

FIG. 5 is a view similar to FIG. 4 but showing the mechanism at the start of the wrapping cycle, with the twine dispensing arm being shown in its position after the inception of the wrapping cycle in dotted lines.

DESCRIPTION OF THE PREFERRED EMBODIMENT

Figure 1:
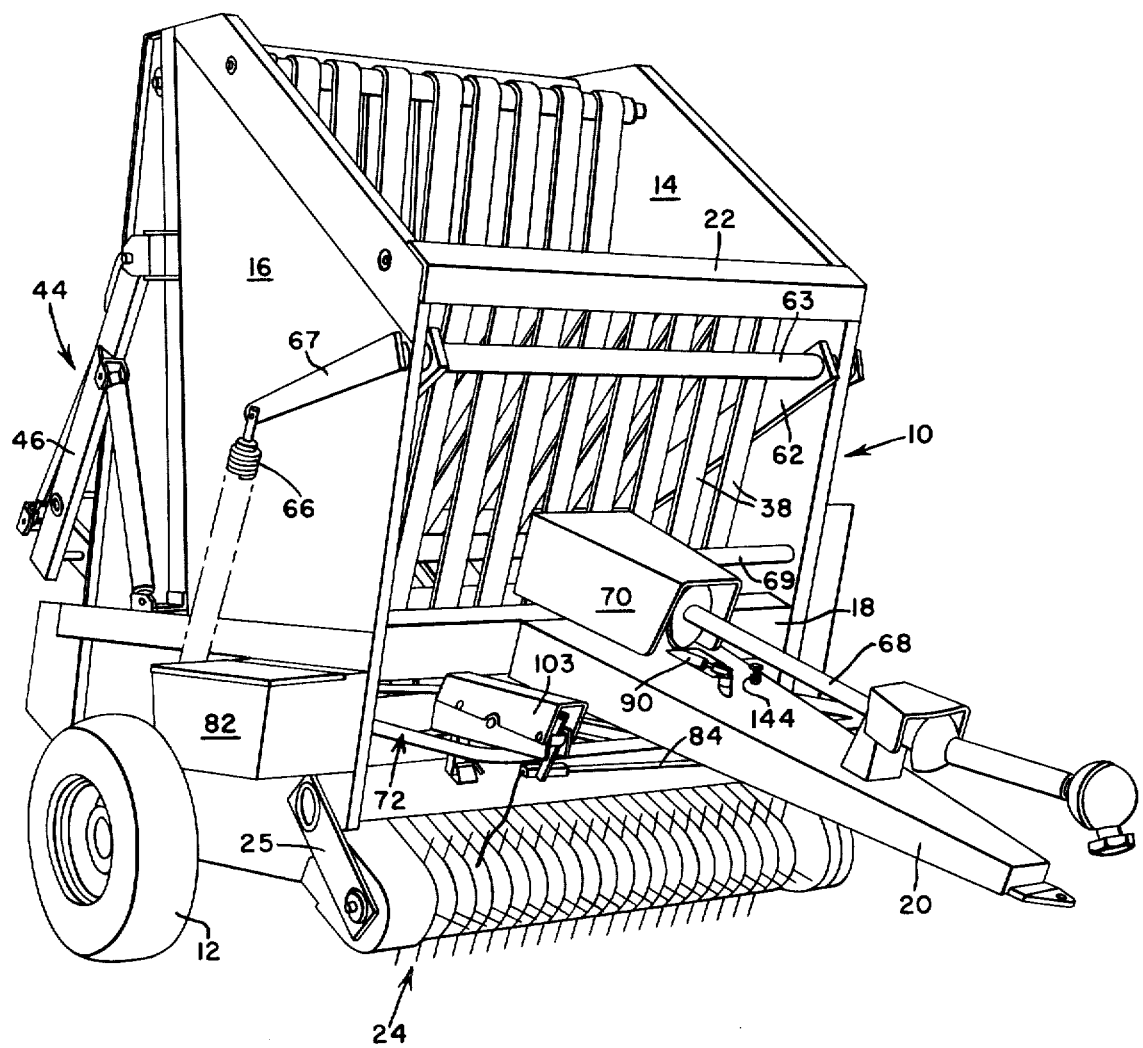
FIG. 1 is a right front perspective of a machine for forming large cylindrical bales of crop material and including the improved mechanism for wrapping a formed bale with twine.

The invention is embodied in a machine for forming large cylindrical bales of hay or the like and includes a mobile main frame 10 mounted on a pair of wheels 12. The main frame includes a pair of upright, opposite, fore and aft extending side walls 14 and 16 at opposite sides of the main frame, the side walls defining a baling chamber therebetween. A transverse beam 18 connects the forward ends of the side walls 14 and 16 and a hollow draft member or tongue 20 extends forwardly from the middle of the transverse beam 18 for connecting the baler to a tractor or the like (not shown) having a conventional rear power take-off mechanism. The main frame also includes a transverse upper beam 22 interconnecting the side walls 14 and 16 above the beam 18.

A pickup mechanism 24, which is of conventional construction and will not be described in detail, is mounted for vertical adjustment on the main frame on a pair of vertically swingable arms 25, the pickup mechanism spanning the width of the main frame forwardly of the baling chamber and being operative to elevate the crop from the field as the machine advances and deliver it rearwardly. A pair of transverse, oppositely rotating compressor rolls 26 and 28 extend between the side walls 14 and 16 immediately to the rear of the pickup mechanism 24, which delivers the crop material rearwardly to the bite between the oppositely rotating rolls 26 and 28, which, in turn, pass the crop rearwardly between the rolls in a mat onto a belt-type conveyor 30. The conveyor 30 spans the width of the machine between the side walls 14 and 16 and includes an endless belt 32 that is trained around the lower compression roll 28 and a rear roller 33. A pair of intermediate rollers 34 and 35 also extend betwen the opposite side walls and support the upper run of the belt 32, the rollers 33, 34, and 35 lying on substantially the same horizontal plane as the lower compression roll 28 so that the upper run of the conveyor 30 is substantially horizontal.

An upper belt-type conveyor 36 disposed between the opposite side walls 14 and 16 above the lower conveyor 30 and includes a plurality of belts 38 that are disposed side by side across the width of the machine. The belts are trained around a lower front roller 40, an upper front roller 41, and a pair of upper intermediate rollers 42 and 43, all of which extend between the opposite side walls 14 and 16 and are engaged by the inner sides of the belts 38. A rear gate assembly is indicated generally by the numeral 44 and includes a pair of upper arms 46, having their rearward ends respectively connected to the oposite side walls 14 and 16 on pivots 47, and a pair of lower arms 48 respectively pivotally connected to the rearward ends of the upper arms 46 on transverse pivots 49, only the arms at the right side of the machine being shown in the drawings. A pair of links 50 respectively extend between the upper ends of the lower arms 48 and brackets 52 on the opposite side walls 14 and 16. A lower rear roller 54 extends between the lower ends of the lower arms 48, while an upper rear roller 56 extends between the lower arms 48 coaxial with the pivots 49, the belts 38 also being trained around the rollers 54 and 56. A pair of hydraulic cylinders 58 respectively extend between the opposite side walls and the upper arms 46 for swinging the arms in unison about their pivots.

Figure 2:
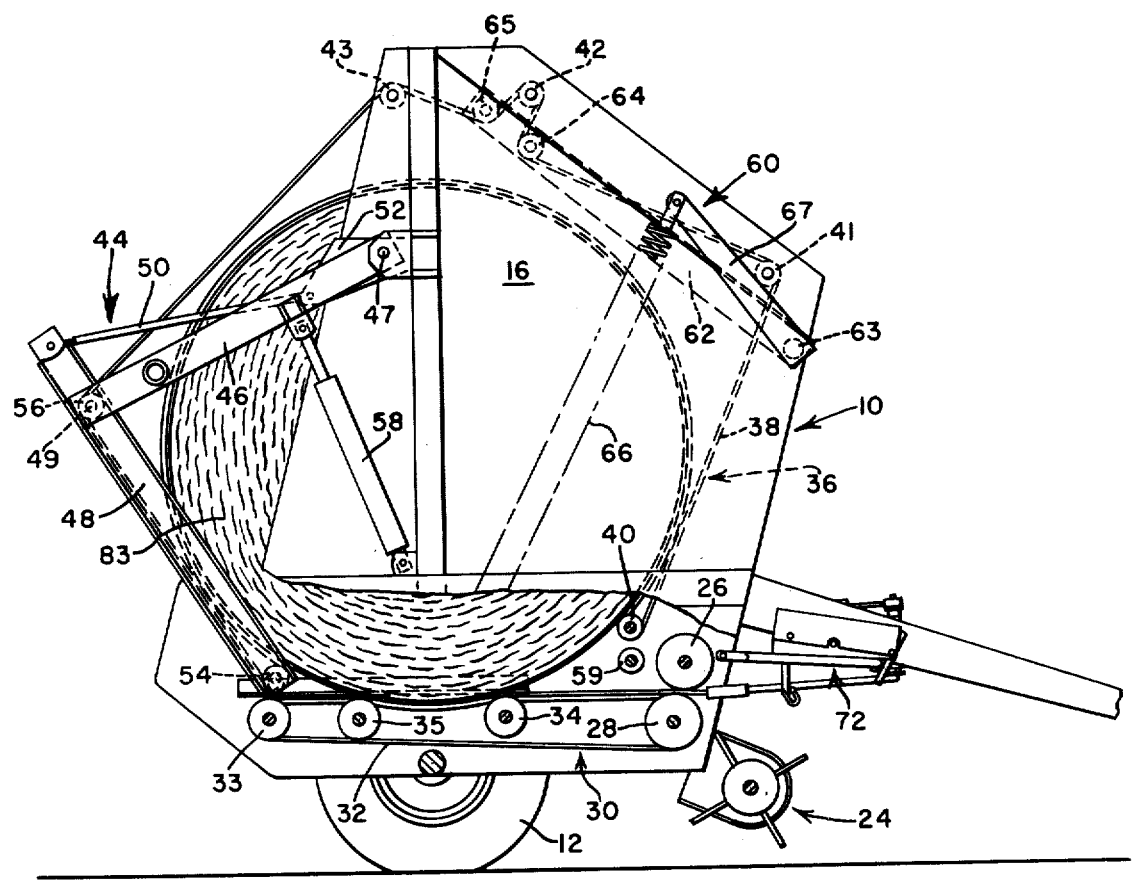
FIG. 2 is a somewhat schematic side elevation view of the baler with portions of the right side wall removed to more clearly show a fully formed bale in the machine.

Initially during the bale forming operation, the lower rear roller 54 is disposed above the front intermediate lower conveyor roller 34, and the belts 38 are inclined upwardly and forwardly to the lower front roller 40. As the crop material is delivered in a mat on top of the upper run of the lower conveyor 30 it moves rearwardly until it engaes the upwardly and forwardly moving lower run of the upper set of belts, which causes the mat of crop material to start to roll. A transverse stripper roller 59 is disposed immediately to the rear of the upper compressor roll 26 and directly below the lower front roller 40 to strip the crop material from the belts 38, so that the crop material does not pass out between the upper compressor roll 36 and the roller 40, the stripper 59 defining the forward end of the baling zone and the shiftable rear roller 54 defining the rearward end. As the bale grows, the rear gate assembly 44 swings rearwardly, the link 50 causing the lower end of the lower arms 48 to move rearwardly approximately in a straight line until the rear roller 54 is above the rearward end of the lower conveyor, as shown in FIG. 2.

Of course, as the bale grows, the belts 38 require substantially increased distances between the lower rear roller 54 and the lower front roller 40, and a belt take-up mechanism, indicated generally by the numeral 60, is provided to supply the necessary belt length. The take-up mechanism 60 includes a pair of arms 62 respectively extending rearwardly from a transverse rockshaft 63 immediately below the upper beam 22, the arms 62 being disposed adjacent the inner sides of the opposite side walls 14 and 16. A pair of rollers 64 and 65 extend between the rearward ends of the arms 62 and engage the exterior sides of the belts 38 on opposite sides of the fixed roller 42. A pair of helical tension springs 66 have their lower ends connected to the respective frame sides and their upper ends connected to a pair of arms 67 extending rearwardly from the opposite ends of the rockshaft 63, so that the springs 66 bias the arms 62 and the rollers 64 and 65 mounted thereon downwardly against the belts. Initially, the rollers 64 and 65 are spaced a substantial distance from the fixed roller 42, but as the bale grows, the arm 62 swing upwardly against the bias of the spring 66 until the bale is fully formed, as shown in FIG. 2. The springs 66 supply an increasing tension in the belts 38 as the bale grows the tension in the upper belts compressing the hay into the bale as it rolls the bale.

As indicated above, the upper run of the lower conveyor 30 moves rearwardly while the lower run of the upper conveyor moves forwardly. The upper and lower conveyors, as well as the compressor rolls, the stripper roller, and the pickup mechanism 24 are driven by conventional belt drives on the left side of the machine, the power for the belt drives being supplied through a fore and aft driveshaft 68 above the implement tongue 20, the forward end of the driveshaft being connectible to a tractor power take-off mechanism in the conventional manner. The rearward end of the driveshaft 68 is connected to a transverse driveshaft 69 through conventional bevel gearing disposed beneath a housing 70, the left end of the transverse shaft 69 providing the input for the various belt drives to the driven components.

A conventional finger type compressor 72 is mounted above the pickup mechanism 24 to hold down the crop as it is being picked up and to guide it between the compressor rolls 26 and 28. The compressor includes a generally horizontal U-shaped frame 74 having its opposite ends connected to the opposite side walls, with the central portion of the frame spanning the width of the machine above the pickup member, a plurality of spring like finger 76 extending rearwardly from the central portion of the compressor frame.

A twine dispensing mechanism, indicated generally by the numeral 78, is mounted on the main frame 10 and on the compressor 72 above the pickup mechanism 24 for feeding a length of twine from a twine supply 80, here shown as a pair of conventional balls of twine mounted in a box-like container 82 on the right side wall 16. The dispensing mechanism is operative to feed twine between the compressor rolls 26 and 28 when it is actuated, the dispensing mechanism being actuated after a bale is fully formed, as shown in FIG. 2, where the formed bale is indicated by the numeral 83, the bale being continuously rotated while the twine is fed rearwardly betweeen the compressor rolls to the baling chamber so that the twine is wound around the exterior of the bale.

Figure 3:
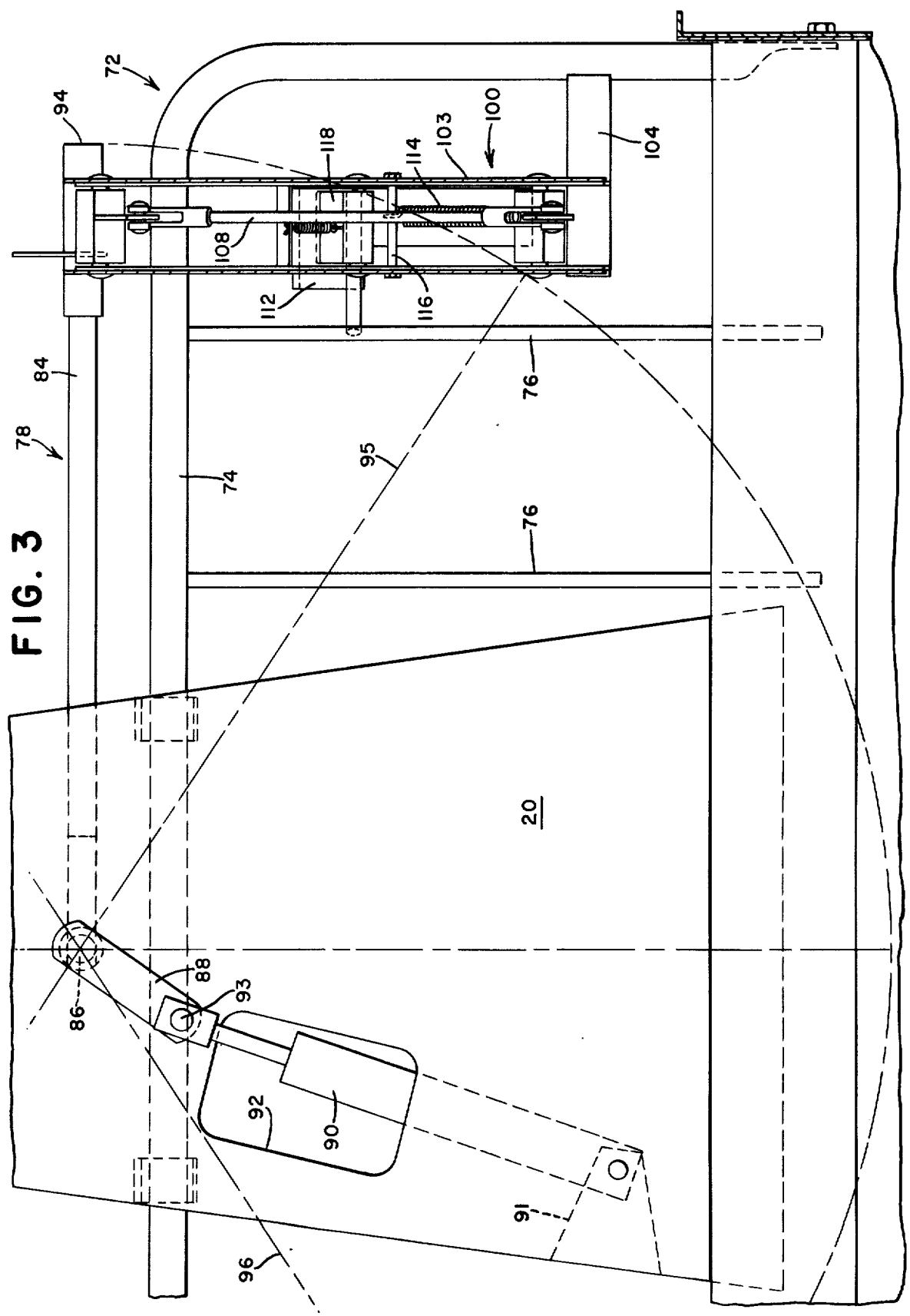
FIG. 3 is an enlarged plan view of the mechanism for dispensing the twine for wrapping the bale.
Figure 4:
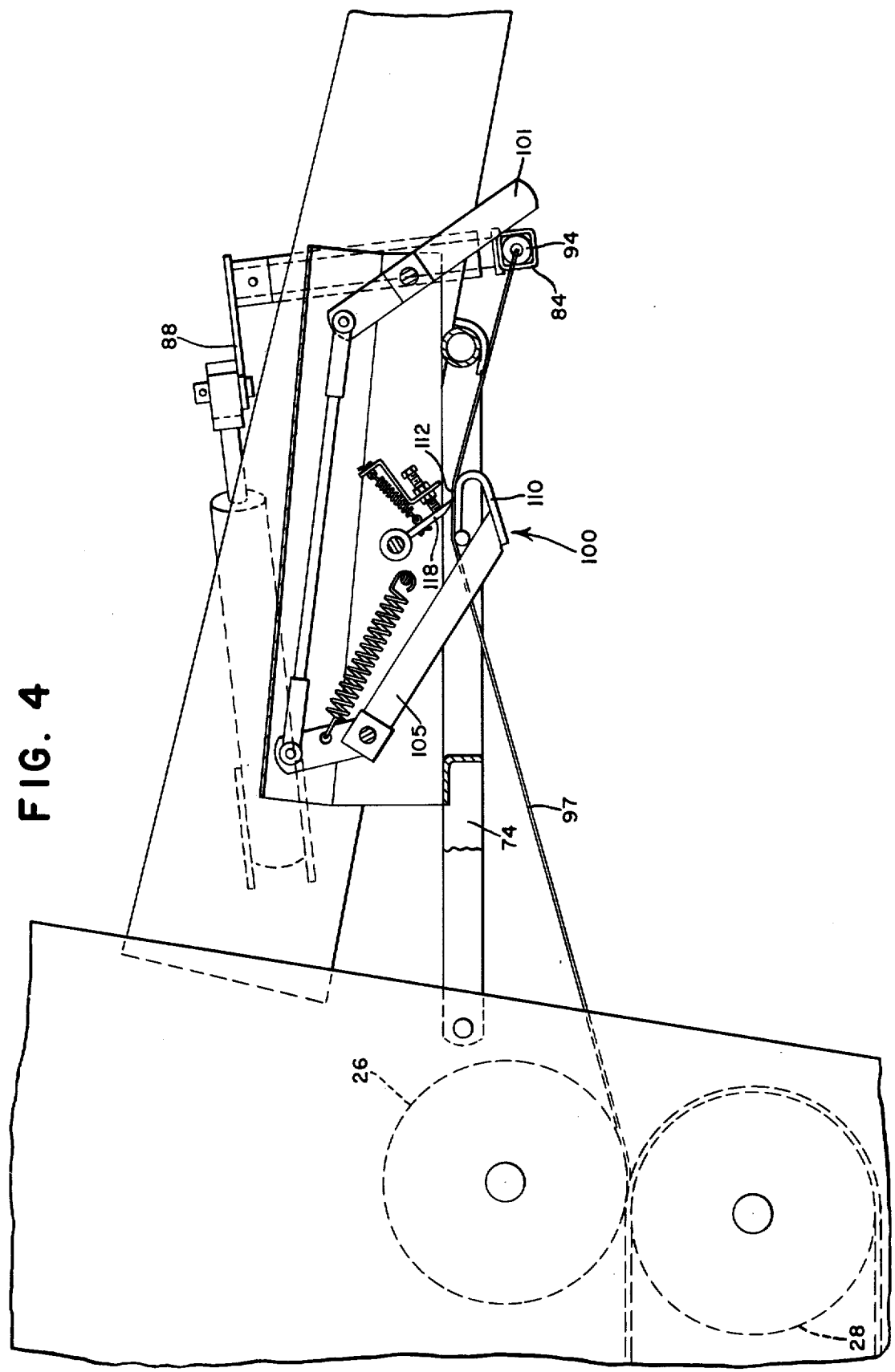
FIG. 4 is an enlarged side elevation view of the twine wrap dispensing mechanism in position for cutting the twine after the completion of a wrapping cycle.

The dispensing mechanism 78 includes a tubular arm or dispensing member 84 that is disposed in a generally horizontal plane and has its one end mounted on a generally vertical rockshaft 86 that is rotatable in a sleeve 87 extending upwardly through the draft member 20. The arm 84 is disposed below the draft member 20 and below the compressor 72, and the upper end of the rockshaft 86 is provided with a lever arm 88. A hydraulic cylinder 90 has its rearward or cylinder end connected to the main frame by a bracket 91, and the cylinder 90 is inclined slightly upwardly and forwardly through an opening 92 in the top of the draft member 20, the forward or piston end of the cylinder 90 being connected to the end of the arm 88 by a vertical pivot pin 93 as best shown in FIGS. 4 and 5. The axis of the rockshaft 86 is inclined upwardly and rearwardly at a relatively small angle from the vertical, so that the arm 84 swings in an arc that is inclined slightly downwardly and rearwardly from the rockshaft. The rearward or free end of the arm 84 is indicated by the numeral 94, and, as is apparent, the end of the arm is in its lowermost position when it is disposed in a fore and aft direction. As shown in FIG. 3, when the cylinder 90 is fully retracted, the arm 84 is disposed in a horizontal, transverse position, which is its normal or a rest position, and when the cylinder is extended, the arm swings rearwardly to a position wherein it is adapted to commence dispensing twine, the approximate position of the arm at one end of the dispensing cycle being indicated by the location line 95 in FIG. 3, while the location line 96 indicates the approximate furthermost position of the arm during the dispensing cycle when the cylinder 90 is fully extended. As is apparent from FIG. 3, the arm swings approximately 30° from its rest position to the position indicated by the line 95, and then swings approximately another 120° to its furthermost position to the left indicated by the line 96, the total travel of the arm being approximately 150° during the extension of the cylinder. After the cylinder is fully extended, it is retracted and swung back to its rest position, which is shown in full lines in FIG. 3.

Figure 6:
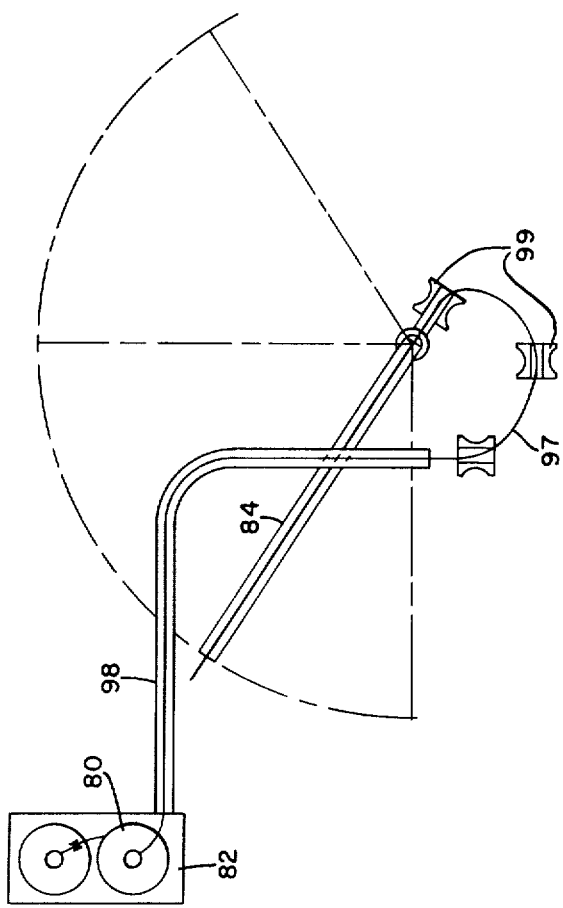
FIG. 6 is a schematic plan view showing the routing of the twine from the storage container through the dispensing mechanism.

As shown in FIG. 6, the twine, which is indicated by the numeral 97 after it leaves the container 82, is threaded through a guide tube 98 and thereafter through a series of guides 99, and then in through the open end of the arm 84 adjacent the rockshaft 86 and out the free end 94 of the arm, the guide tube 98 and guides 99 being only schematically shown in FIG. 6. As previously described, the twine 97 is fed from the free end of the arm between the compressor rolls 26 and 28 while the bale is rotating and while the arm is swung across the width of the baling chamber and back, the arm actuating a cutoff mechanism, indicated generally by the numeral 100, as it returns to its rest position.

The cutoff mechanism includes a generally vertical lever arm 101 that is swingably mounted on a transverse pivot 102 that extends between the opposite sides of an inverted U-shaped hood or housing 103. The forward end of the housing 103 is supported on top of the transverse portion of the compressor frame 74, while the rearward end of the housing is connected to the rearwardly extending right leg portion of the compressor frame by a bracket 104. The cutoff mechanism also includes a bell crank 105, that is swingably mounted on a transverse pivot shaft 106 parallel to the pivot 102. A generally fore and aft link 108 connects the upper ends of the lever arm 101 and the bell crank 105, while the lower end of the bell crank 105 is provided with a U-shaped anvil 110 having a flat, transversely extending surface 112. A helical tension spring 114 extends between the upper end of the bell crank 105 and a post 116 on the housing 103 to bias the bell crank 105 in a clockwise direction, as viewed in FIG. 5, the link 108 connecting the bell crank and the lever arm 101 also causing the spring to bias the lever arm in the same direction.

A flat knife blade 118 is swingably mounted on a transverse pivot 120 that also extends between the opposite sides of the housing 103, and the knife blade 118 is biased upwardly and forwardly against an adjustable stop 122 by a spring 124 that has one end connected to the knife blade and the other end connected to a bracket 126, which is connected to the housing and also supports the screw-type adjustable stop 122.

Figure 7:
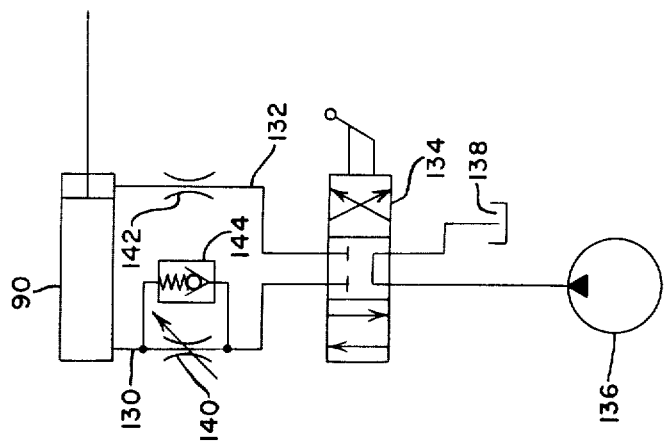
FIG. 7 is a schematic view of the hydraulic circuit for controlling the hydraulic cylinder that actuates the twine dispensing and cutoff mechanism.

As schematically shown in FIG. 7, the opposite ends of the cylinder 90 are provided with hydraulic lines 130 and 132, and a manually actuatable control valve 134 is shiftable into three different positions, the neutral or rest position being shown in the drawing wherein both the lines are blocked. When the valve is shifted in one direction from the neutral position, the line 130 is connected to a fluid pressure source 136, preferably the hydraulic pump on the towing tractor, while the opposite line 132 is connected to the reservoir 138, causing the cylinder to extend. The control valve is preferably mounted at the operator's station on the tractor for selective actuation by the operator. When the cylinder is fully extended, the operator actuates the valve 134 to reverse the fluid flow, so that the hydraulic line is pressurized while the line 130 is connected to the reservoir. A variable orifice 140 is provided in the hydraulic line 130, the variable orifice being in the form of a needle-type flow control valve that is disposed adjacent to the hydraulic cylinder 90 and extends upwardly through the hollow draft member so that it is easily accessible for adjustment by the operator of the machine. A fixed orifice 142 is provided in the hydraulic line 132 to control the flow rate through the line 132, and a check valve 144 is provided in the line 132 in parallel with the variable orifice 140. As is apparent, the check valve permits the bypass of the variable orifice during the extension of the cylinder, so that the rate of extension of the cylinder and consequently the rate of movement of the arm during the extension stroke of the cylinder is controlled only by the fixed orifice 142. However, when the flow direction is reversed for the retraction of the cylinder, the flow must go through the variable orifice, which permits the operator to control the rate of retraction of the cylinder and consequently the rate of movement of the arm during the return portion of the dispensing cycle.

In operation the dispensing mechanism is normally maintained in its rest condition, wherein the cylinder 90 is fully retracted and the arm 84 extends in a transverse direction, as shown in FIGS. 3 and 4. In this position, the arm engages the lower end of the lever arm 101 to rock the lever in a counterclockwise direction, the link 108 between the upper ends of the arm and the bell crank 105 causing the bell crank 105 and the anvil 110 mounted on the lower end of the bell crank to move upwardly against the knife blade 118, the adjustable stop 122 preventing further movement of the knife blade and consequently further movement of the anvil, the bell crank, and the lever arm 101.

When the bale 83 is fully formed, as shown in FIG. 2, the operator normally stops further forward movement of the machine to interrupt the flow of material delivered by the pickup mechanism 24. Concurrently, the operator actuates the valve 134 to cause the cylinder 90 to extend. The extension of the cylinder, of course, starts fo swing the arm 84 rearwardly, and as the arm 84 moves rearwardly it disengages the lower end of the lever arm 101, which permits the lever arm 101 to swing in a clockwisee direction as viewed in FIG. 4, which in turn permits the bell crank 105 to swing in a clockwise direction, causing the anvil 110 to swing downwardly and away from the knife blade 118. This, of course, frees the twine that is clamped between the knife blade and the anvil, allowing the loose end of twine that is to the exterior of the tube 84 to hang downwardly. If there is any crop material moving into the machine, the dangling free end of the twine will be intermeshed with the crop material and carried rearwardly between the compressor rolls to the baling chamber. If the crop material does not pick up the dangling end of the twine, further movement of the arm to a straight fore and aft position, as shown in dashed lines in FIG. 5, will position the rearward or free end 94 of the arm immmediately in front of the bite between the compressor rolls. As is apparent, the end of the twine will then be picked up by the lower conveyor and passed between the compressor rolls to the baling chamber, where the rotating bale engages the twine and starts to pull it out through the arm, the guides, and the tube 98 from the supply container. As the bale rotates, the twine is wound around the bale, and since the arm 84 is moving toward the left side of the machine, the winding will be in the form of a spiral. The number of wraps around the bale in the initial phase would normally be fixed, since the rate of extension of the cylinder and consequently the rate of travel of the arm is constant and the rotational speed of the bale is also constant, although, of course, a variable orifice could be also substituted for the orifice 142 to control the number of turns during the initial wrapping phase.

After the cylinder is fully extended and the arm reaches the position indicated by number 96 in FIG. 3, the control valve is reversed to start the retraction of the cylinder. The twine is obviously wound around the bale during the entire return cycle of the arm. As previously described, the rate of retraction of the cylinder 90 and consequently the speed of movement of the arm can be controlled by the variable orifice 140 to control the number of wraps placed around the bale in the return portion of the cycle. As is also apparent, the wrapping might not start until the midpoint of the bale when the arm is moving toward the left side of the machine, although substantially the entire axial length of the bale will be wrapped on the return of the arm.

When the arm returns substantially to its transverse position, it again engages the lower end of the lever arm 101 to actuate the cutoff mechanism 100. As is apparent, after the arm engages the lever arm 101, it rotates the arm 101 in a counterclockwise direction, which causes the bell crank 105 to also rotate in a counterclockwise direction, swinging the anvil 110 upwardly toward the knife 118. The anvil is so positioned, that it picks up the twine that is being fed to the baling chamber, the twine riding along the flat surface 112 of the anvil. When the anvil 110 reaches its uppermost position, as shown in FIG. 4, the twine engages the knife blade 118, and the forward movement of the twine, which catches on the knife blade 118 swings the knife blade 118 downwardly against the anvil 110 so that the cutoff means is self-energizing. The pinching of the twine 97 between the knife blade 118 and the anvil surface 112, severs the twine, the portion of the twine rearwardly of the cut being pulled into the bale chamber by the rotating bale, while the forward end of the severed twine has sufficient fibers at the cut that are clamped between the knife and the anvil that the end of the twine remains clamped as long as the anvil stays in the position against the knife as shown in FIG. 4. This, of course, prevents the loose end of the twine from dangling into the flow of crop material, to eliminate the inadvertant entangling of the twine in the crop material that would cause the twine to pull out of the dispensing mechanism. As previously described, the variable orifice allows the operator to place as many wraps of twine around the bale as he desires, so that if a more durable bale than usual is required, such as when the bale is to be frequently handled or transported, a larger number of wraps can be placed on the bale.

I claim:

1. In a machine for forming large cylindrical bales of crop material and including a mobile main frame, and crop delivery means operative to deliver a mat of crop material to a baling zone where a bale forming mechanism rolls the mat of material into a bale and is operative to continue rolling the bale after it reaches a selected size while a wrapping element is fed to the baling zone to wind the wrapping element around the bale as it rotates, the combination therewith of an improved dispensing mechanism for selectively feeding the wrapping element from a supply of continuous wrapping element on the machine to the baling zone and comprising: a shiftable dispenser member operatively carrying the wrapping element and shiftable between a rest condition, wherein it supports the free end of the wrapping element, and a dispensing condition wherein it is laterally shiftable on the machine forwardly of the baling zone to feed the wrapping element across a substantial portion of the baling zone as a formed bale rotates so that the wrapping element is wound around the bale; and automatic cutoff means operatively associated with the dispensing member for cutting the wrapping element exteriorly of the dispensing member when the dispensing member is shifted to a predetermined position and including an anvil and a knife blade, the anvil being shiftable between an inoperative position and a cutoff position wherein it engages the wrapping element and moves the wrapping elemenet against the knife blade, the cutoff means including an actuating mechanism operatively connected to the anvil and engageable by the dispensing member so that it swings the anvil from its inoperative position to its cutoff position in response to shifting of the dispensing member to said predetermined position.

2. The invention defined in claim 1 wherein the knife blade is mounted on the frame for swinging toward the anvil in response to its engagement by the moving wrapping element so that the wrapping element energizes the knife blade to sever the wrapping element.

3. The invention defined in claim 2 wherein said predetermined position of the dispenser member is the rest position, and the actuating mechanism holds the anvil against the blade in the rest position of the dispensing member to clamp the loose end of the wrapping element at the cut between the anvil and blade while the dispensing member is in its rest position.

4. The invention defined in claim 3 and including adjustable stop means operatively associated with the knife blade to limit the movement of the blade away from the anvil so that the blade is maintained against the anvil to clamp the end of the wrapping element, and spring means operatively connected to the blade for biasing the blade against the stop means.

5. The invention defined in claim 4 and including selectively actuable power means operatively connected to the dispensing member for shifting the member from its rest position and for shifting said member during its dispensing condition.

6. The invention defined in claim 5 wherein the dispensing member includes a generally horizontal arm swingably mounted on a generally vertical pivot for swinging in a generally horizontal arc that spans a substantial portion of the width of the baling zone forwardly of the baling zone.

7. The invention defined in claim 6 wherein the crop delivery means includes a pair of transversely extending, oppositely rotating compressor rolls operative to deliver the crop rearwardly in a mat to the baling zone and the wrapping element is dispensed from the free end of the arm which is disposed immediately in front of the bite of the compressor rolls when the arm is in a generally horizontal fore and aft position.

8. The invention defined in claim 7 wherein the arm pivot is inclined upwardly and slightly rearwardly from the vertical so that the free end of the arm is in its lowermost position when it is generally fore and aft.

9. In a machine for forming large cylindrical bales of crop material and including a mobile main frame, and crop delivery means operative to deliver a mat of crop material to a baling zone where a bale forming mechanism rolls the mat of material into a bale and is operative to continue rolling the bale after it reaches a selected size while a wrapping element is fed to the baling zone to wind the wrapping element around the bale as it rotates, the combination therewith of an improved dispensing mechanism for selectively feeding the wrapping element from a supply of continuous wrapping element on the machine to the baling zone and comprising: a shiftable dispenser member operatively carrying the wrapping element and shiftable between a rest-condition, wherein it supports the free end of the wrapping element, and a dispensing condition wherein it is laterally shiftable on the machine forwardly of the baling zone to feed the wrapping element across a substantial portion of the baling zone as a formed bale rotates so that the wrapping element is wound around the bale; automatic cutoff means operatively associated with the dispensing member for cutting the wrapping element exteriorly of the dispensing member when the dispensing member is shifted to a predetermined position; and selectively actuable power motor means operatively connected to the dispensing member for shifting the member from its rest position and for shifting said member during its dispensing condition.

10. The invention defined in claim 9 wherein the dispensing member includes a generally horizontal arm swingably mounted on a generally vertical pivot for swinging in a generally horizontal arc that spans a substantial portion of the width of the baling zone forwardly of the baling zone.

11. The invention defined in claim 9 wherein the cutoff means includes an anvil and a knife blade, the anvil being shiftable between an inoperative position and a cutoff position wherein it engages the wrapping element and moves the wrapping element against the knife blade, the cutoff means including an actuating mechanism operatively connected to the anvil and engagable by the dispensing member so that it swings the anvil from its inoperative position to its cutoff position in response to shifting of the dispensing member to said rest condition.

12. The invention defined in claim 11 wherein the dispensing member includes a generally horizontal arm swingably mounted on a generally vertical pivot for swinging in a generally horizontal arc that spans a substantial portion of the width of the baling zone forwardly of the baling zone.

13. The invention defined in claim 12 wherein the vertical pivot is formed by a rockshaft, and the power means includes a hydraulic cylinder operatively connected to the rockshaft for rocking the shaft and swinging the arm.

14. In a machine for forming large cylindrical bales of crop material and including a mobile main frame and crop delivery means operative to deliver a mat of crop material to a baling zone where a bale forming mechanism rolls the mat of material into a bale and is operative to continue rolling the bale after it reaches a selected size while a wrapping element is fed to the baling zone to wind the wrapping element around the base as it rotates, the combination therewith of an improved dispensing mechanism for selectively feeding the wrapping element from a supply of continuous wrapping element on the machine to the baling zone and comprising: a generally horizontal arm swingably mounted on a generally vertical pivot for swinging in a generally horizontal arc wherein the free end of the arm substantially traverses a substantial portion of the width of the baling zone forwardly of the baling zone, the free end of the arm carrying the wrapping element to dispense the wrapping element across said portion of the baling zone as the arm swings from one end of its arc to the other so that the wrapping element is wound around a substantial portion of the bale as the wrapping element is fed from the arm when the bale is rotating; and a hydraulic cylinder operatively connected to the arm for swinging the arm in said arc.

15. The invention defined in claim 14 wherein the arm is mounted on a generally vertical rockshaft, and the hydraulic cylinder is operatively connected to the rockshaft by a lever arm to swing the dispenser arm in said arc.

16. The invention defined in claim 15 wherein said rockshaft is inclined upwardly and slightly rearwardly from the vertical so that the free end of the arm is in its lowermost position when it is in a generally fore and aft position.

17. The invention defined in claim 14 and including an automatic cutoff means operatively associated with the arm for cutting the wrapping element rearwardly of the free end of the arm when the arm is shifted to a predetermined position.

* * * * *